US012772004B2

(12) United States Patent
Kuze et al.

(10) Patent No.: US 12,772,004 B2
(45) Date of Patent: Oct. 20, 2026

(54) SEGMENTED DIAPHRAGM AND ELECTROACOUSTIC TRANSDUCER

(71) Applicant: Panasonic Intellectual Property Management Co., Ltd., Osaka (JP)

(72) Inventors: Mitsukazu Kuze, Osaka (JP); Tetsushi Itano, Osaka (JP); Ryouichi Uemoto, Osaka (JP); Hiroyuki Morimoto, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 197 days.

(21) Appl. No.: 18/404,304

(22) Filed: Jan. 4, 2024

(65) Prior Publication Data

US 2024/0244379 A1 Jul. 18, 2024

(30) Foreign Application Priority Data

Jan. 13, 2023 (JP) ................................ 2023-003820
Aug. 22, 2023 (JP) ................................ 2023-134730

(51) Int. Cl.
*H04R 9/06* (2006.01)
*H04R 7/12* (2006.01)
*H04R 9/02* (2006.01)

(52) U.S. Cl.
CPC ............ *H04R 7/122* (2013.01); *H04R 9/025* (2013.01); *H04R 9/063* (2013.01)

(58) Field of Classification Search
USPC ........................................................ 381/401
See application file for complete search history.

(56) References Cited

U.S. PATENT DOCUMENTS 1,696,565 A * 12/1928 Blieberger ............... H04R 7/00 181/174
1,936,939 A * 11/1933 Hahnle .................... H04R 7/12 381/354
1,990,409 A * 2/1935 Lawrance ................ H04R 7/06 181/173

(Continued)

FOREIGN PATENT DOCUMENTS

JP S4923859 Y1 6/1974
JP S5255735 U 4/1977

(Continued)

OTHER PUBLICATIONS

Notice of Reasons for Refusal dated Jun. 2, 2026 issued in Japanese patent application No. 2023-003820 along with an English translation.

*Primary Examiner* — Fan S Tsang
*Assistant Examiner* — Sean Rinehart
(74) *Attorney, Agent, or Firm* — Greenblum & Bernstein, P.L.C.

(57) ABSTRACT

A diaphragm including at least a first portion, a second portion, and a third portion that are arranged around a predetermined reference axis extending in a vibration direction, and each have a different cross-sectional shape along a plane that includes the reference axis, in which the cross-sectional shape of the first portion is an arc having a first radius of curvature, the cross-sectional shape of the second portion is an arc having a second radius of curvature different from the first radius of curvature, and the cross-sectional shape of the third portion is a part of an ellipse.

20 Claims, 11 Drawing Sheets

(56) References Cited

U.S. PATENT DOCUMENTS

| | | | | | |
|---|---|---|---|---|---|
| 2,115,924 | A * | 5/1938 | Fisher | H04R 7/122 | 181/173 |
| 3,961,378 | A * | 6/1976 | White | H04R 31/003 | 381/432 |
| 4,881,617 | A * | 11/1989 | Faraone | H04R 7/14 | 181/173 |
| 7,120,263 | B2 * | 10/2006 | Azima | H04R 7/045 | 381/152 |
| 9,628,917 | B2 * | 4/2017 | Pircaro | H04R 7/14 | |
| 2003/0219141 | A1 * | 11/2003 | Sugata | H04R 7/127 | 381/430 |
| 2005/0078850 | A1 * | 4/2005 | Norton | H04R 7/14 | 381/423 |
| 2005/0094836 | A1 * | 5/2005 | Manrique | H04R 7/12 | 381/337 |
| 2005/0180588 | A1 * | 8/2005 | Opitz | H04R 7/20 | 381/386 |
| 2006/0191742 | A1 * | 8/2006 | Inagaki | H04R 7/122 | 181/173 |
| 2008/0230304 | A1 * | 9/2008 | Windischberger | H04R 7/20 | 181/157 |
| 2017/0215007 | A1 * | 7/2017 | Noro | H04R 9/06 | |
| 2019/0379979 | A1 * | 12/2019 | Wang | H04R 31/003 | |
| 2020/0077196 | A1 * | 3/2020 | Inoue | H01F 7/126 | |
| 2022/0150618 | A1 * | 5/2022 | O'Brien, Sr. | H04R 9/06 | |

FOREIGN PATENT DOCUMENTS

| | | |
|---|---|---|
| JP | S6193096 U | 6/1986 |
| JP | 63-181095 | 11/1988 |
| JP | 63-200993 | 12/1988 |
| JP | 01 (64)-029991 | 2/1989 |
| JP | 01 (64)-029992 | 2/1989 |
| JP | 2000-354289 | 12/2000 |

* cited by examiner

SEGMENTED DIAPHRAGM AND ELECTROACOUSTIC TRANSDUCER

CROSS REFERENCE TO RELATED APPLICATIONS

The present application is based on and claims priority of Japanese Patent Application No. 2023-003820 filed on Jan. 13, 2023 and Japanese Patent Application No. 2023-134730 filed on Aug. 22, 2023.

FIELD

The present disclosure relates to a diaphragm and an electroacoustic transducer equipped with the diaphragm.

BACKGROUND

Conventionally, a cone-shaped diaphragm with a circular shape in a plan view has a resonance mode close to that of a circular diaphragm, and peaks and dips occur in a sound pressure frequency characteristic in the mid-high range. Patent Literature (PTL) 1 to 5 each describe a technique for suppressing peaks and dips by dispersing resonance, using a diaphragm that includes a plurality of fan-shaped portions, which are arranged in the circumferential direction and have mutually different cross-sectional shapes.

CITATION LIST

Patent Literature

PTL 1: Japanese Unexamined Utility Model Application Publication No. 63-181095
PTL 2: Japanese Unexamined Utility Model Application Publication No. 63-200993
PTL 3: Japanese Unexamined Utility Model Application Publication No. 1-029991
PTL 4: Japanese Unexamined Utility Model Application Publication No. 1-029992
PTL 5: Japanese Unexamined Patent Application Publication No. 2000-354289

SUMMARY

However, the diaphragm disclosed in each of PTL 1 to 5 above can be improved upon.

The present disclosure provides a diaphragm capable of improving upon the above related art and an electroacoustic transducer equipped with the diaphragm.

In order to achieve the above object, a diaphragm as one aspect of the present disclosure is a diaphragm provided in an electroacoustic transducer, the diaphragm including at least a first portion, a second portion, and a third portion that are arranged around a predetermined reference axis extending in a vibration direction, and each have a different cross-sectional shape along a plane that includes the predetermined reference axis. The cross-sectional shape of the first portion is an arc having a first radius of curvature, the cross-sectional shape of the second portion is an arc having a second radius of curvature different from the first radius of curvature, and the cross-sectional shape of the third portion is a part of an ellipse.

In order to achieve the above object, an electroacoustic transducer as one aspect of the present disclosure is an electroacoustic transducer including a diaphragm, a magnetic circuit, a frame that holds the magnetic circuit and the diaphragm, and a voice coil coupled to the diaphragm and disposed in a magnetic gap included in the magnetic circuit. The diaphragm includes at least a first portion, a second portion, and a third portion that are arranged in a circumferential direction and each have a different cross-sectional shape along a plane perpendicular to the circumferential direction. The cross-sectional shape of the first portion is an arc having a first radius of curvature, the cross-sectional shape of the second portion is an arc having a second radius of curvature different from the first radius of curvature, and the cross-sectional shape of the third portion is a part of an ellipse.

According to the present disclosure, it is possible to further improve upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Figure 1:
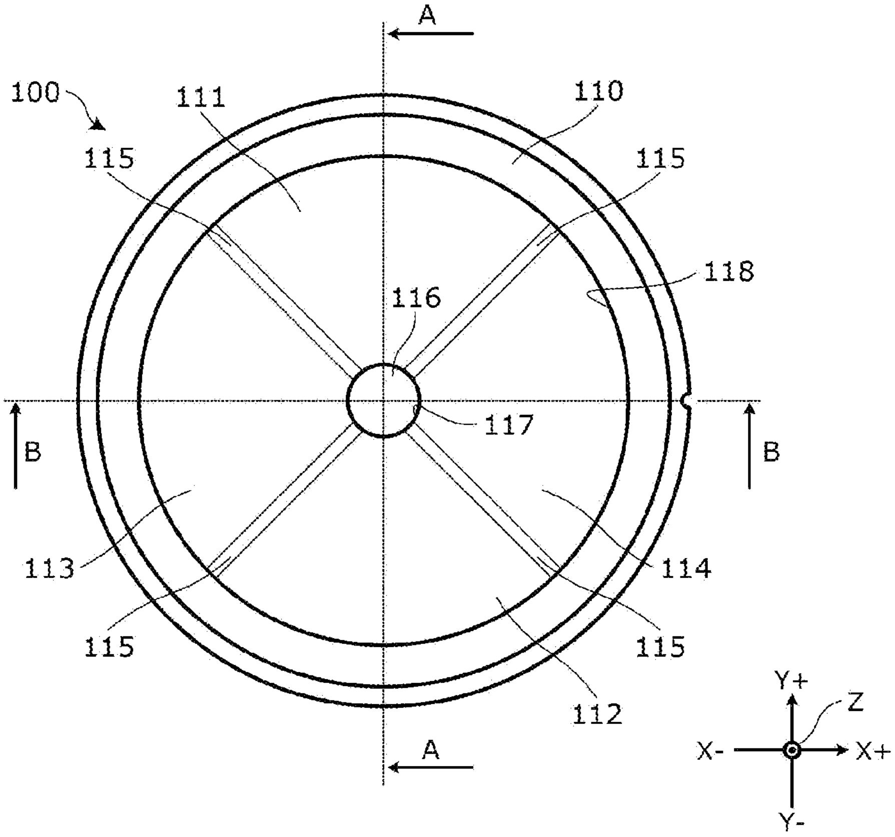
FIG. 1 is a plan view illustrating, from the front, a diaphragm with an edge attached thereto according to Embodiment 1.

Embodiments of a diaphragm and an electroacoustic transducer according to the present disclosure will be described below with reference to the drawings. Note that the following embodiments are provided by way of example to describe the present disclosure, and are not intended to limit the present disclosure. For example, the shapes, structures, materials, components, relative positional relationships, connecting states, numerical values, mathematical expressions, contents of each step in methods, sequence of each step, and the like shown in the following embodiments are examples, and contents not described below may be included. While geometric expressions, such as "parallel" and "orthogonal", may be used, these expressions do not imply strict mathematical precision and include substantially allowable errors, deviations, and the like. Expressions such as "simultaneous" and "the same" also include substantially allowable ranges.

The drawings are schematic views with emphasis, omission, or adjustment of ratios made as appropriate to describe the present disclosure, and may not represent shapes, positional relationships, and proportions different from the actual ones. The X, Y, and Z axes that may be shown in the drawings indicate Cartesian coordinates set arbitrarily for the description of the drawings. That is, the Z axis is not necessarily an axis extending in the vertical direction, and the X and Y axes are not necessarily present in the horizontal plane.

In the following, a plurality of inventions may be comprehensively described as one embodiment. Some of the contents below are described as optional components related to the present disclosure.

Embodiment 1

Figure 2:
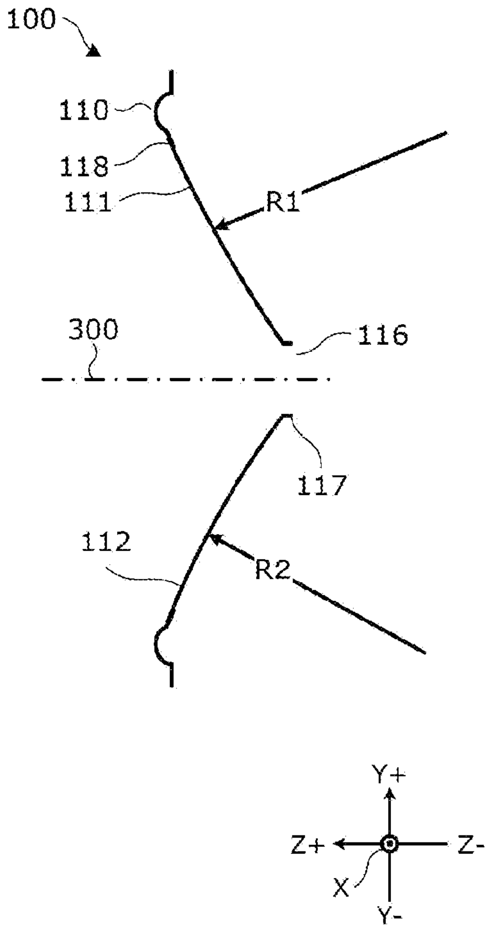
FIG. 2 is a cross-sectional view illustrating the diaphragm and the edge cut along line A-A in FIG. 1.
Figure 3:
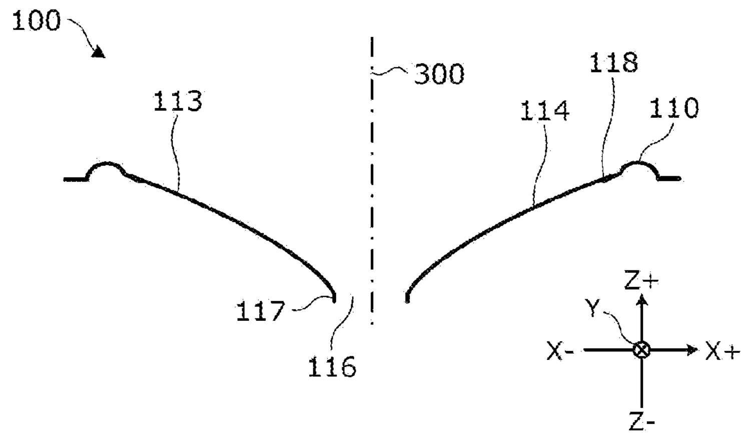
FIG. 3 is a cross-sectional view illustrating the diaphragm and the edge cut along line B-B in FIG. 1.

FIG. 1 is a plan view illustrating, from the front, diaphragm 100 with edge 110 attached thereto according to Embodiment 1. FIG. 2 is a cross-sectional view of diaphragm 100 and edge 110 cut along line A-A in FIG. 1. FIG. 3 is a cross-sectional view of diaphragm 100 and edge 110 cut along line B-B in FIG. 1.

Diaphragm 100 is a member that is provided in an electroacoustic transducer, such as a loudspeaker device or a microphone, and vibrates itself to move the air and generate sound or vibrates itself based on air movements. Diaphragm 100 includes at least first portion 111, second portion 112, and third portion 113. In the present embodiment, diaphragm 100 also includes fourth portion 114.

First portion 111, second portion 112, third portion 113, and fourth portion 114 are arranged around predetermined reference axis 300 (see FIGS. 2 and 3) that lies along the vibration direction (the Z-axis direction in the drawing). First portion 111, second portion 112, and third portion 113 are portions each having a different cross-sectional shape along a plane that includes reference axis 300 (for example, cross sections cut along line A-A and line B-B in FIG. 1). Third portion 113 and fourth portion 114 have the same cross-sectional shape along a plane that includes reference axis 300.

In the present embodiment, diaphragm 100 has a circular shape in a plan view, that is, in a state viewed from the direction of reference axis 300. First portion 111, second portion 112, third portion 113, and fourth portion 114 have the same fan shape in the plan view. Diaphragm 100 has a diameter of about 100 mm in the plan view. First portion 111, second portion 112, third portion 113, and fourth portion 114 also have the same area in the plan view. Note that connecting portion 115 (details to be described later) is provided at the boundary of each of first portion 111, second portion 112, third portion 113, and fourth portion 114. Therefore, the shape of each of first portion 111, second portion 112, third portion 113, and fourth portion 114 in the plan view is not a perfect fan shape.

Third portion 113 and fourth portion 114 are arranged between first portion 111 and second portion 112. First portion 111 and second portion 112 are not adjacent to each other. Third portion 113 and fourth portion 114 are not adjacent to each other.

As illustrated in FIG. 2, the shape of the cross section of first portion 111, which includes reference axis 300, is a single arc having first radius of curvature R1. The cross-sectional shape remains uniform when first portion 111 is cut along any cross section that includes reference axis 300. That is, first portion 111 is a part of a rotating body around reference axis 300.

The shape of the cross section of second portion 112, which includes reference axis 300, is a single arc having second radius of curvature R2. The cross-sectional shape remains uniform when second portion 112 is cut along any cross section that includes reference axis 300. That is, second portion 112 is a part of the rotating body around reference axis 300. In the present embodiment, first radius of curvature R1 is greater than second radius of curvature R2. In the present embodiment, first radius of curvature R1 is greater than or equal to 1.5 times second radius of curvature R2. More specifically, first radius of curvature R1 is 300 mm, and second radius of curvature R2 is 200 mm.

As illustrated in FIG. 3, each of the cross-sectional shapes of third portion 113 and fourth portion 114 is a part of an ellipse. In the present embodiment, each of the cross-sectional shapes of third portion 113 and fourth portion 114, when cut along its major and minor axes, is a quarter portion of an ellipse or a fraction of that quarter portion. The cross-sectional shape remains uniform when each of third portion 113 and fourth portion 114 is cut along any cross section that includes reference axis 300. That is, each of third portion 113 and fourth portion 114 is a part of the rotating body around reference axis 300.

Figure 4:
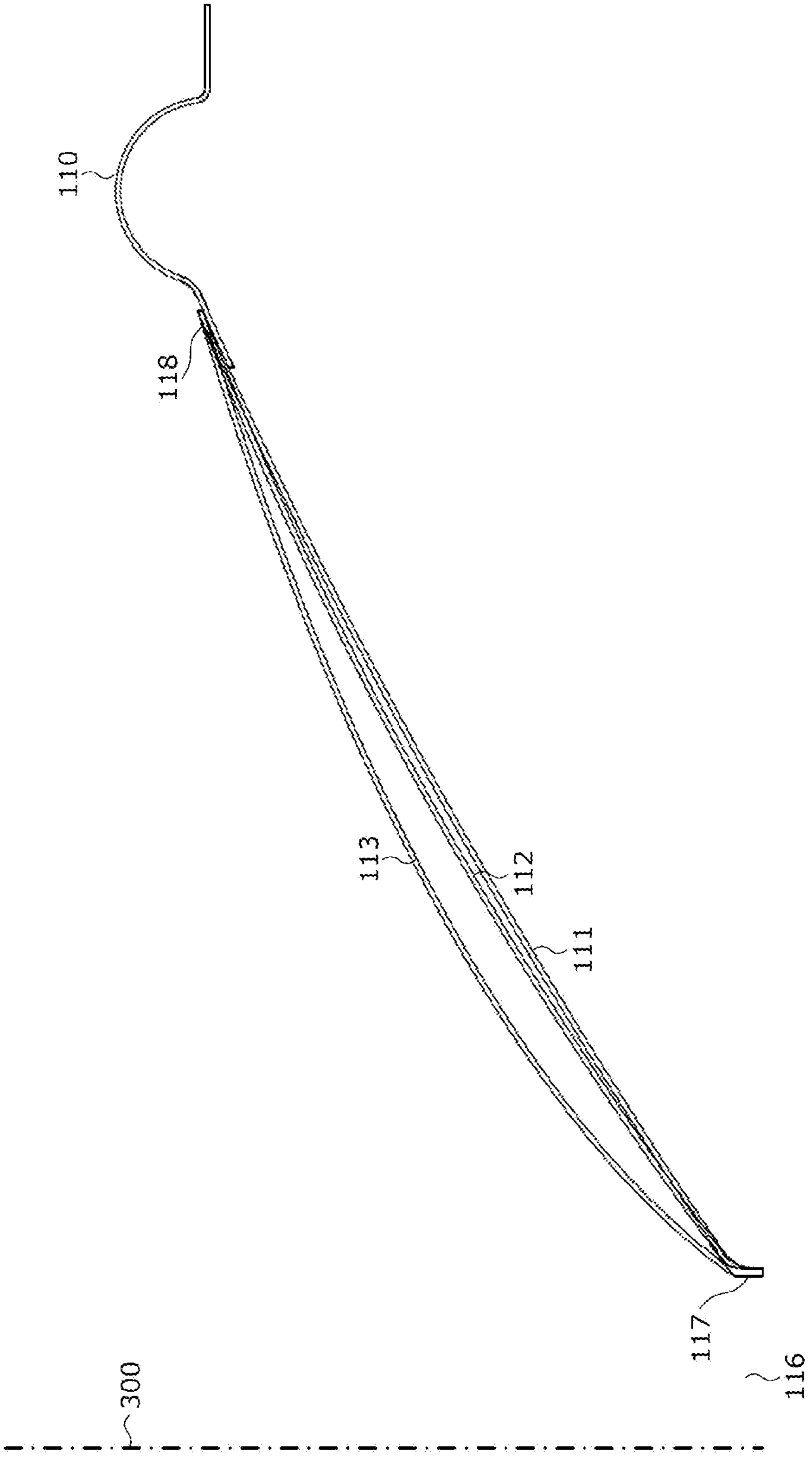
FIG. 4 is an overlapped view illustrating respective cross sections of a first portion, a second portion, and a third portion, with their corresponding reference axes made coincident, according to Embodiment 1.

FIG. 4 is an overlapped view illustrating first portion 111, second portion 112, and third portion 113, with their corresponding reference axes 300 made coincident. In the present embodiment, as illustrated in FIG. 4, when first portion 111, second portion 112, and third portion 113 (as well as fourth portion 114) are overlapped with their corresponding reference axes 300 made coincident, there is no overlapping portion except at both ends of first portion 111, second portion 112, and third portion 113. Third portion 113 is in the state of having a larger bulge than first portion 111 and second portion 112, and first portion 111 is in the state of having a smaller bulge than second portion 112 and third portion 113. Third portion 113 is disposed between first portion 111 and second portion 112.

Connecting portion 115 is a portion for connecting adjacent portions of diaphragm 100 having different cross-sectional shapes, and constitutes a part of diaphragm 100. In the present embodiment, connecting portion 115 continuously connects the following: first portion 111 and third portion 113; third portion 113 and second portion 112; second portion 112 and fourth portion 114; and fourth portion 114 and first portion 111.

In the present embodiment, in the plan view: the respective boundary lines of connecting portion 115 with first portion 111 and with third portion 113 are arranged in parallel; the respective boundary lines of connecting portion 115 with third portion 113 and with second portion 112 are arranged in parallel; the respective boundary lines of connecting portion 115 with second portion 112 and with fourth portion 114 are arranged in parallel; and the respective boundary lines of connecting portion 115 with fourth portion 114 and with first portion 111 are arranged in parallel.

Diaphragm 100 is made by integrally forming first portion 111, second portion 112, third portion 113, fourth portion

114, and connecting portion 115 that connects between each of these portions. In the center of diaphragm 100 in the plan view, through hole 116 connected to voice coil 131 (see FIG. 8) is provided. Diaphragm 100 includes cylindrical cone neck portion 117 at the peripheral edge of through hole 116 to strengthen the connection with voice coil 131. The tube axis of cone neck portion 117 coincides with reference axis 300. First portion 111, second portion 112, third portion 113, fourth portion 114, and connecting portion 115 are all integrally connected to cone neck portion 117. The thickness at the boundary of cone neck portion 117 with first portion 111 is different from the thickness at the boundary of cone neck portion 117 with third portion 113. In the present embodiment, the inner peripheral surface of cone neck portion 117 has a cylindrical shape. The difference in thickness at the boundary between cone neck portion 117 and each portion is based on the difference in thickness protruding outward from the cylindrical inner peripheral surface. Forming the inner periphery of cone neck portion 117 into a cylindrical shape ensures a firm connection with voice coil 131. The uneven shape of the outer periphery of cone neck portion 117 absorbs the difference in the cross-sectional shape of each portion.

Outer peripheral edge portion 118 of diaphragm 100 in the plan view is integrally connected to second portion 112, third portion 113, fourth portion 114, and connecting portion 115. Outer peripheral edge portion 118 is a portion connected to edge 110. The surface of outer peripheral edge portion 118 connected to edge 110 has a frustoconical shape. The thickness at outer peripheral edge portion 118 corresponding to third portion 113 (as well as fourth portion 114) is greater than the thickness at outer peripheral edge portion 118 corresponding to first portion 111. The difference in thickness at outer peripheral edge portion 118 corresponding to each portion is based on the difference in thickness protruding in the direction away from edge 110. Forming the surface of outer peripheral edge portion 118 connected to edge 110 into a frustoconical shape ensures a firm connection with edge 110. The uneven shape of outer peripheral edge portion 118 absorbs the difference in the cross-sectional shape of each portion.

The material making up diaphragm 100 is not limited. For example, diaphragm 100 may be formed by making paper from at least one of chemical fiber, such as polyester fiber or pulp, or may be formed of a resin compounded with a reinforcing material.

Embodiment 2

Next, Embodiment 2 will be described. Note that the same reference numerals are assigned to elements (or portions) that have similar actions or functions, or have similar shapes, mechanisms, or structures, to those in Embodiment 1, and the description thereof may be omitted. In the following, respects that differ from those in Embodiment 1 will be mainly described, and the description of the same contents as those in Embodiment 1 may be omitted.

Figure 5:
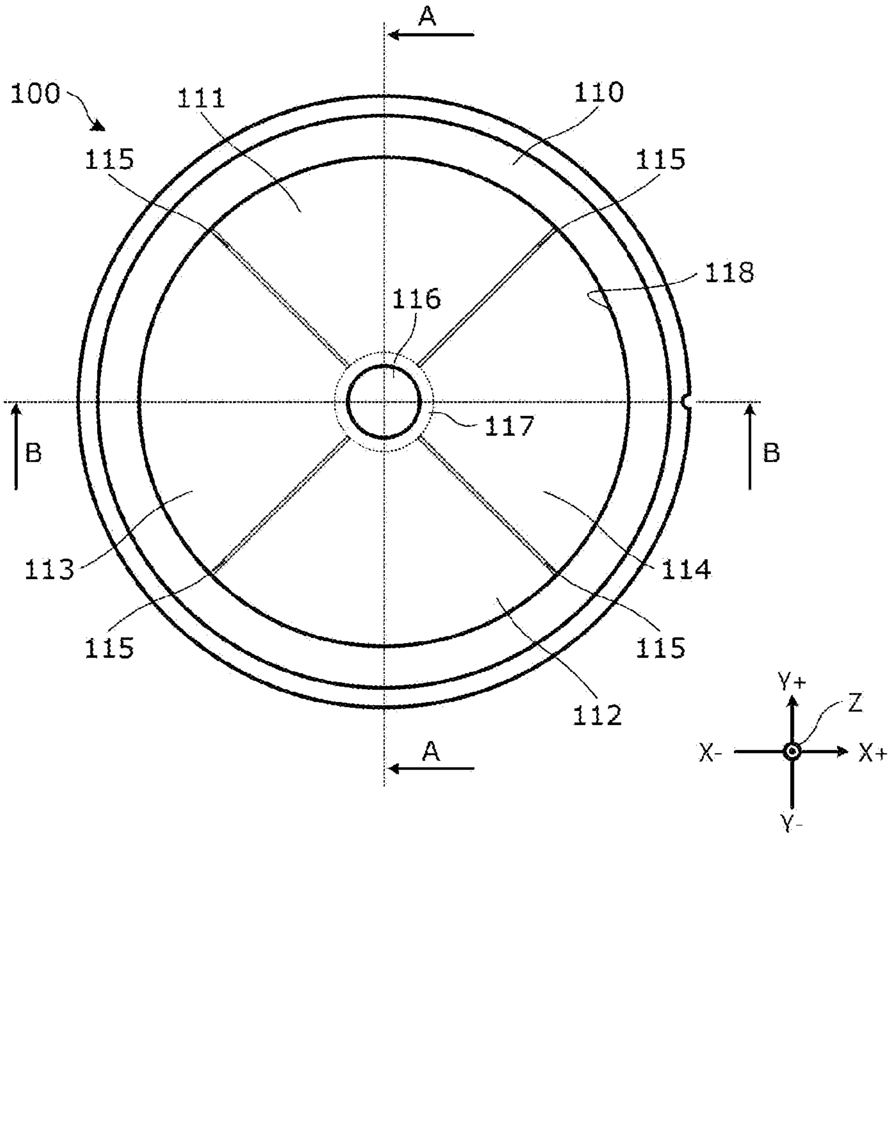
FIG. 5 is a plan view illustrating, from the front, a diaphragm with an edge attached thereto according to Embodiment 2.
Figure 6:
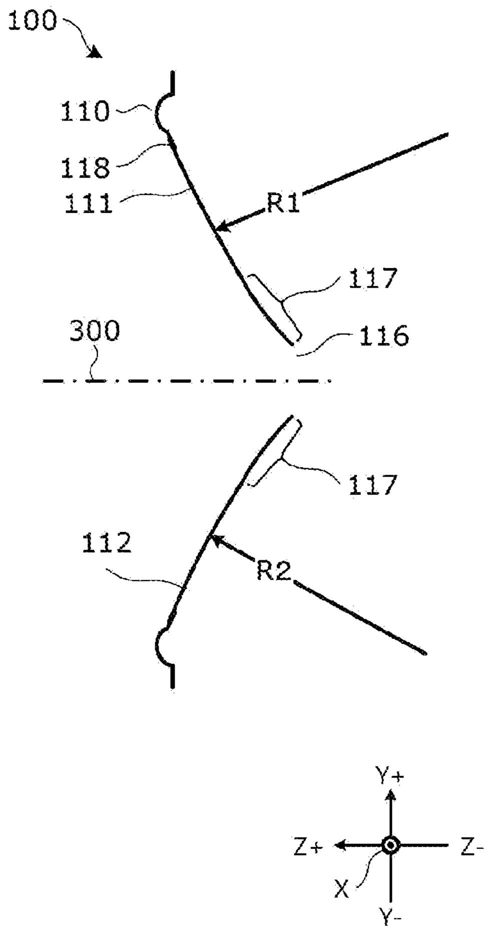
FIG. 6 is a cross-sectional view illustrating the diaphragm and the edge cut along line A-A in FIG. 5.
Figure 7:
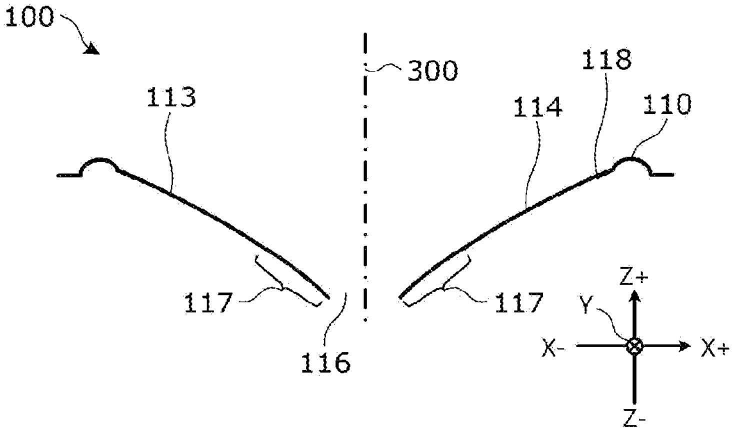
FIG. 7 is a cross-sectional view illustrating the diaphragm and the edge cut along line B-B in FIG. 5.

FIG. 5 is a plan view illustrating, from the front, diaphragm 100 with edge 110 attached thereto. FIG. 6 is a cross-sectional view of diaphragm 100 and edge 110 cut along line A-A in FIG. 5. FIG. 7 is a cross-sectional view of diaphragm 100 and edge 110 cut along line B-B in FIG. 5.

Neck portion 117 is a portion of diaphragm 100 connected to the respective end edges on the side of reference axis 300 of first portion 111, second portion 112, and third portion 113. In the present embodiment, neck portion 117 is connected to the respective end edges on the side of reference axis 300 of fourth portion 114 and connecting portion 115. Neck portion 117 is a portion to which dust cap 160 (see FIG. 8) is attached. The cross-sectional shape of neck portion 117, along any plane including reference axis 300, is a uniform curve. Neck portion 117 is a rotating body with reference axis 300 as its central axis.

In the present embodiment, the cross-sectional shape of neck portion 117 on a plane that includes reference axis 300 is an arc, and neck portion 117 is continuously connected to first portion 111, second portion 112, third portion 113, fourth portion 114, and connecting portion 115. The radius of curvature of neck portion 117 is one-tenth or less of the larger one of the first radius of curvature R1 and the second radius of curvature R2. In the present embodiment, the radius of curvature of neck portion 117 is one-tenth or less of the smaller one of the first radius of curvature R1 and the second radius of curvature R2. Specifically, the radius of curvature of neck portion 117 is 20 mm or less.

Diaphragm 100 is made by integrally forming first portion 111, second portion 112, third portion 113, fourth portion 114, connecting portion 115, and neck portion 117. Through hole 116 connected to voice coil 131 (see FIG. 8) is provided in the center of neck portion 117 of diaphragm 100 in the plan view. Through hole 116 is covered with dust cap 160 attached to neck portion 117.

Figure 8:
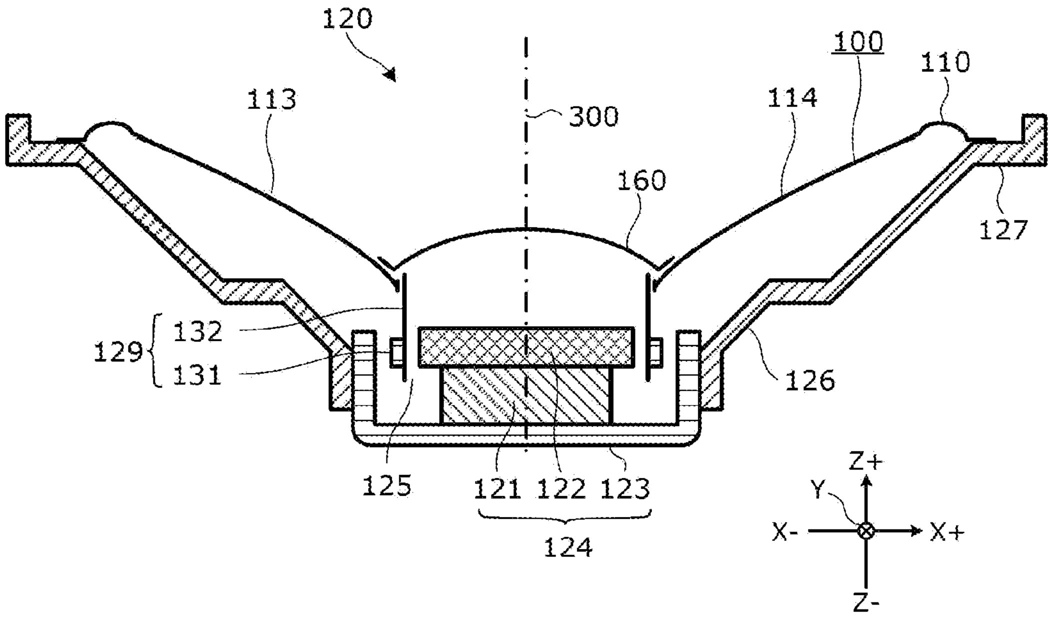
FIG. 8 is a cross-sectional view of a loudspeaker device that is one of electroacoustic transducers equipped with the diaphragm.

FIG. 8 is a cross-sectional view of loudspeaker device 120 that is one of electroacoustic transducers equipped with diaphragm 100. As illustrated in FIG. 8, loudspeaker device 120 includes diaphragm 100, magnetic circuit 124, a frame that holds magnetic circuit 124 and diaphragm 100, and voice coil 131 coupled to diaphragm 100 and disposed in a magnetic gap included in magnetic circuit 124.

In the present embodiment, magnetic circuit 124 included in loudspeaker device 120 is magnetic circuit 124 of an internal magnet type, formed by sandwiching magnetized magnet 121 between upper plate 122 and yoke 123.

Yoke 123 of magnetic circuit 124 is coupled to frame 126. Annular edge 110 connecting outer peripheral edge portion 118 of diaphragm 100 with frame 126 is bonded to peripheral edge portion 127 of frame 126. The center portion of diaphragm 100 is coupled to one end of voice coil body 129. The other end of voice coil body 129 is disposed to fit into magnetic gap 125 of magnetic circuit 124. In the present embodiment, voice coil body 129 includes voice coil 131 and bobbin 132, around which voice coil 131 is wound. However, voice coil body 129 may not include bobbin 132.

Although loudspeaker device 120 that includes magnetic circuit 124 of the internal magnet type has been described, the present invention is not limited thereto, and diaphragm 100 may be applied to loudspeaker device 120 that includes magnetic circuit 124 of an external magnet type.

Figure 9:
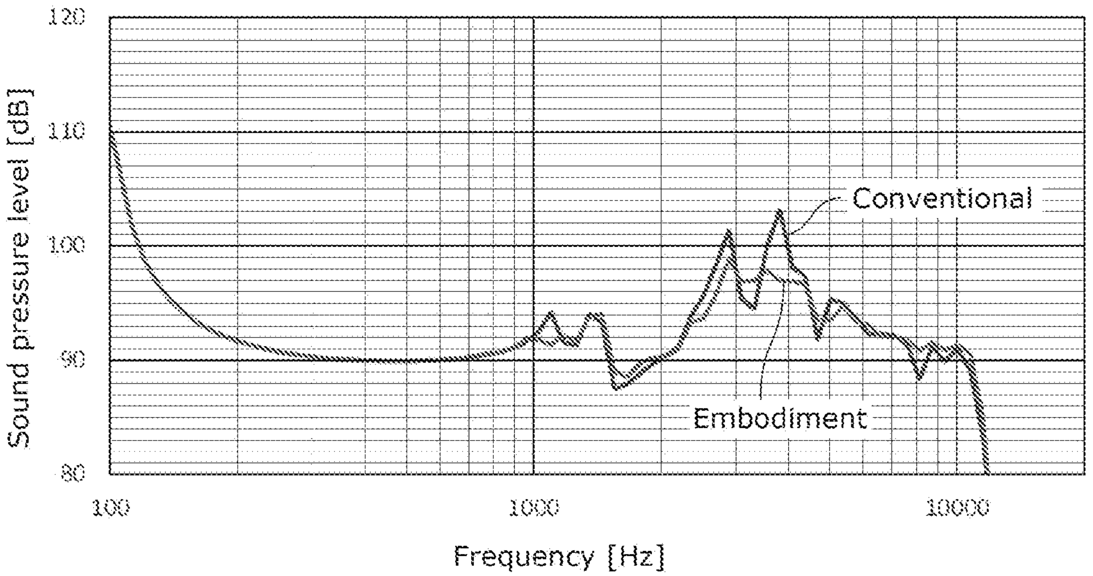
FIG. 9 is a diagram illustrating the difference in sound pressure frequency characteristic between a loudspeaker device equipped with a diaphragm having a conventional shape and the loudspeaker device equipped with the diaphragm in the present embodiment.

FIG. 9 is a diagram illustrating the difference in sound pressure frequency characteristic between a loudspeaker device equipped with a diaphragm having a conventional shape and loudspeaker device 120 equipped with diaphragm 100 in the present embodiment. As illustrated in FIG. 9, the sound pressure frequency characteristic of the loudspeaker device equipped with the conventional diaphragm has prominent peaks and dips in the vicinity of 3 kHz and 4 kHz, for example. On the other hand, loudspeaker device 120 equipped with diaphragm 100 in the embodiment can effectively disperse resonance, suppress peaks and dips, and obtain a flat acoustic characteristic, particularly in the vicinity of 3 kHz and 4 kHz.

According to loudspeaker device 120 in the present embodiment, it is possible to effectively disperse the resonance of diaphragm 100, resulting in a loudspeaker with a flat sound pressure frequency characteristic in the mid-high range. Further, it is possible to extend the high-range limit frequency of the loudspeaker and realize sound quality that is highly accurate and capable of high-fidelity reproduction.

Note that the present disclosure is not limited to the above embodiments. For example, another embodiment, which is realized through any combination of the components described herein or exclusion of some of the components, may be taken as an embodiment of the present disclosure. The present disclosure also includes variations that can be obtained by making various modifications to the above embodiments, which a person skilled in the art can conceive, without departing from the spirit of the present disclosure, that is, the meaning shown by the wording in the claims.

For example, although the case where the cross-sectional shape of third portion 113 and the cross-sectional shape of fourth portion 114 are the same has been described as an embodiment, the cross-sectional shape of third portion 113 and the cross-sectional shape of fourth portion 114 may be different. That is, fourth portion 114 may not be a part of an ellipse and can adopt any shape.

Annular edge 110 interposed between diaphragm 100 and the frame may include a diaphragm connecting portion that has a shape following the shape of the outer peripheral edge portion of diaphragm 100, that is, a shape corresponding to the difference in the cross-sectional shape of each portion of diaphragm 100.

Although the case where diaphragm 100 is divided into four equal portions at 90° intervals in the plan view has been described, the divided portions may not be equal. Diaphragm 100 may have three portions with different cross-sectional shapes, or five or more portions.

Although the cross-sectional shape of neck portion 117 has been described as an arc, the cross-sectional shape of neck portion 117 may be any curve, such as a part of an ellipse or a part of a hyperbola.

Figure 10:
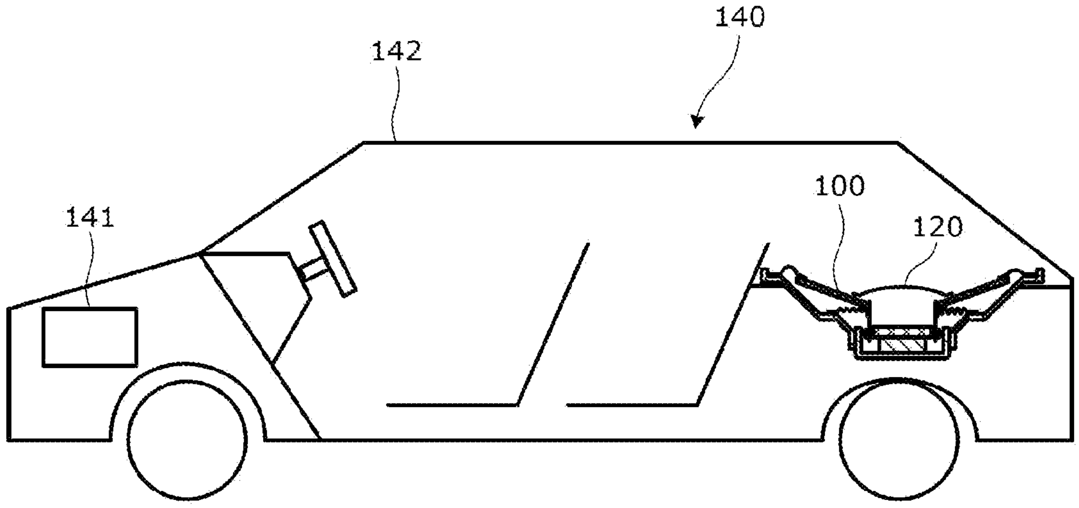
FIG. 10 is a cross-sectional view of an automobile that is one of mobile vehicles in which the loudspeaker device equipped with the diaphragm is installed.

The electroacoustic transducer including diaphragm 100 may be provided in a mobile vehicle. FIG. 10 is a cross-sectional view of automobile 140 that is one of mobile vehicles in which loudspeaker device 120 equipped with diaphragm 100 is installed. Automobile 140 includes loudspeaker device 120, equipped with diaphragm 100, on the rear tray as well as the front panel, pillar, and door. Loudspeaker device 120 is used as a part of a car navigation system or a car audio system. Automobile 140 includes drive means 141 and moves loudspeaker device 120, together with vehicle body 142 that functions as a housing for loudspeaker device 120.

Figure 11:
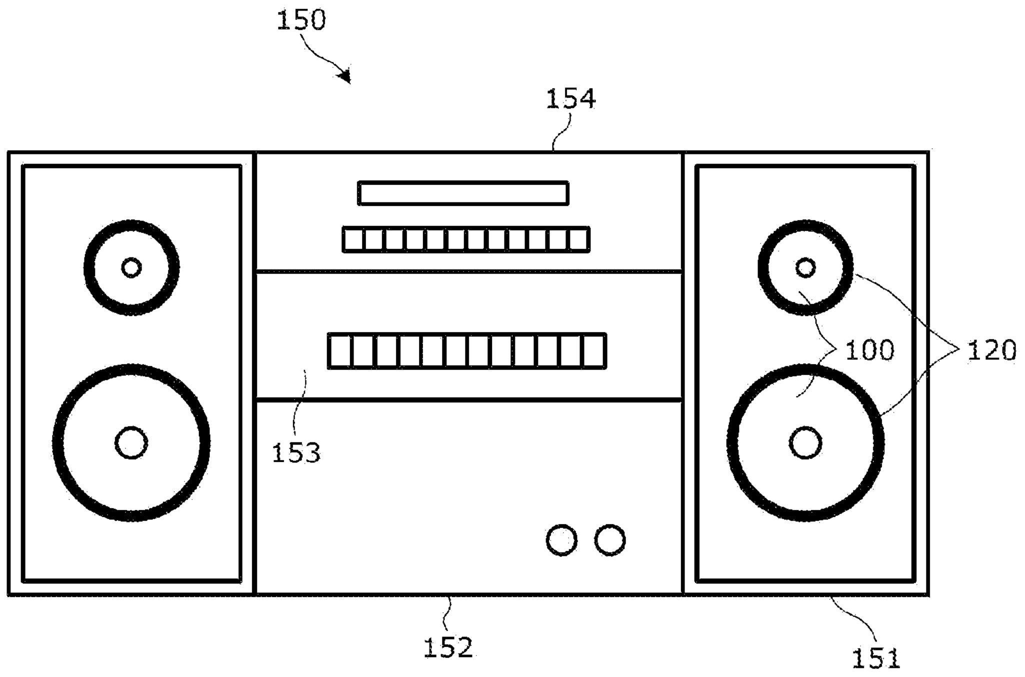
FIG. 11 is a diagram illustrating a mini-component system that is one type of electronic equipment in which the loudspeaker device equipped with the diaphragm is installed.

Loudspeaker device 120 equipped with diaphragm 100 may be provided in electronic equipment as illustrated in FIG. 11. FIG. 11 is a diagram illustrating another application of loudspeaker device 120 equipped with diaphragm 100. Audio mini-component system 150 will be described as an example of electronic equipment that includes loudspeaker device 120 equipped with diaphragm 100.

In mini-component system 150, two loudspeaker devices 120 are incorporated in each of two enclosures 151. Mini-component system 150 is also equipped with: amplifier 152 that includes an amplifier circuit for an electric signal input to loudspeaker device 120; tuner 153 that outputs a source to be input to amplifier 152; and compact disc (CD) player 154. Mini-component system 150, which is an audio mini-component system, amplifies a music signal or the like input from tuner 153 or CD player 154 using amplifier 152. Based on the amplified signal, sound is emitted from loudspeaker device 120. Note that examples of the electronic equipment include, in addition to mini-component system 150, automotive audio systems, portable audio equipment that can be carried, video equipment such as liquid crystal display (LCD) televisions and organic electroluminescent (OEL) display televisions, information communication equipment such as cell phones, and computer-related equipment.

Diaphragm 100 in a first aspect of the present disclosure is diaphragm 100 provided in an electroacoustic transducer, diaphragm 100 including at least first portion 111, second portion 112, and third portion 113 that are arranged around a predetermined reference axis extending in a vibration direction, and each have a different cross-sectional shape along a plane that includes the reference axis, in which the cross-sectional shape of first portion 111 is an arc having a first radius of curvature, the cross-sectional shape of second portion 112 is an arc having a second radius of curvature different from the first radius of curvature, and the cross-sectional shape of third portion 113 is a part of an ellipse.

According to diaphragm 100 in the first aspect, it is possible to ensure effective resonance dispersion, suppress peaks and dips, and realize a flat sound pressure frequency characteristic.

Diaphragm 100 in a second aspect subordinate to the first aspect further including: fourth portion 114 arranged in a circumferential direction with first portion 111, second portion 112, and third portion 113, wherein a cross-sectional shape of fourth portion 114 is a part of an ellipse.

Diaphragm 100 in a third aspect subordinate to the first aspect or the second aspect, wherein the cross-sectional shape of third portion 113 and the cross-sectional shape of fourth portion 114 are different.

Diaphragm 100 in a fourth aspect subordinate to any one of the first to third aspects, further including: connecting portion 115 that continuously connects at least one of the following: first portion 111 and third portion 113; or second portion 112 and third portion 113.

Diaphragm 100 in a fifth aspect subordinate to any one of the first to fourth aspects, wherein in a plan view, boundary lines of at least one of the following pairs are arranged in parallel: a boundary line between the connecting portion and first portion 111, and a boundary line between the connecting portion and third portion 113; or a boundary line between the connecting portion and second portion 112, and a boundary line between the connecting portion and third portion 113.

Diaphragm 100 in a sixth aspect subordinate to any of the first to fifth modes, further including: neck portion 117 connected to voice coil 131, wherein a thickness at a boundary of neck portion 117 with first portion 111 is different from a thickness at a boundary of neck portion 117 with third portion 113.

Diaphragm 100 in a seventh aspect subordinate to any one of the first to sixth aspects, wherein a thickness at an outer peripheral edge portion of third portion 113 is greater than a thickness at an outer peripheral edge portion of first portion 111.

Diaphragm 100 in an eighth aspect subordinate to any one of the first to seventh aspects, wherein diaphragm 100 includes paper made from a material that contains at least one of chemical fiber or pulp.

Diaphragm 100 in a ninth aspect subordinate to the first aspect, wherein diaphragm 100 includes injection-molded resin.

Diaphragm 100 in a tenth aspect subordinate to any one of the first to seventh aspects, wherein diaphragm 100 includes a press-molded sheet- or film-shaped material.

Diaphragm 100 in an eleventh aspect subordinate to any one of the first to tenth aspects, including: neck portion 117 that surrounds the predetermined reference axis extending in the vibration direction; and at least first portion 111, second portion 112, and third portion 113 outside neck portion 117, wherein a cross-sectional shape of neck portion 117, along any plane including the reference axis, is a uniform curve.

According to diaphragm 100 in the eleventh aspect, it is possible to ensure effective resonance dispersion, suppress peaks and dips, and realize a flat sound pressure frequency characteristic, and neck portion 117 can facilitate the attachment of other members such as dust cap 160 in the central portion of diaphragm 100.

Diaphragm 100 in a twelfth aspect subordinate to any one of the first aspect to the eleventh aspect, wherein the cross-sectional shape of neck portion 117 is an arc.

Diaphragm 100 in a thirteenth aspect subordinate to any one of the first to twelfth aspects, wherein a radius of curvature of neck portion 117 is one-tenth or less of both the first radius of curvature and the second radius of curvature.

An electroacoustic transducer in a fourteenth aspect including: diaphragm 100 in any one of the first to thirteenth aspects; magnetic circuit 124; frame 126 that holds magnetic circuit 124 and diaphragm 100; and voice coil 131 coupled to diaphragm 100 and disposed in magnetic gap 125 included in magnetic circuit 124.

An electroacoustic transducer in a fifteenth aspect subordinate to the fourteenth aspect further including edge 110 interposed between diaphragm 100 and frame 126 and having an annular shape, wherein edge 110 includes a diaphragm connecting portion that follows a shape of an outer peripheral edge portion of diaphragm 100.

An electroacoustic transducer in a sixteenth aspect subordinate to the fourteenth aspect or the fifteenth aspect, wherein diaphragm 100 includes: neck portion 117 that surrounds the predetermined reference axis extending in the vibration direction; and at least first portion 111, second portion 112, and third portion 113 outside neck portion 117, wherein a cross-sectional shape of neck portion 117, along any plane including the reference axis, is a uniform curve.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2023-003820 filed on Jan. 13, 2023 and Japanese Patent Application No. 2023-134730 filed on Aug. 22, 2023.

INDUSTRIAL APPLICABILITY

The diaphragm and the electroacoustic transducer of the present disclosure can be applied to electronic equipment such as audiovisual equipment and telecommunications equipment, mobile vehicles such as automobiles, and the like.

The invention claimed is:

1. A diaphragm provided in an electroacoustic transducer, the diaphragm comprising at least:

a first portion, a second portion, and a third portion that are arranged around a predetermined reference axis extending in a vibration direction, and each have a different cross-sectional shape along a plane that includes the predetermined reference axis, wherein an entire cross-sectional shape of the first portion is a single arc having a first radius of curvature that extends from a cone neck portion to an outer peripheral edge, an entire cross-sectional shape of the second portion is a single arc having a second radius of curvature that extends from a cone neck portion to an outer peripheral edge, the second radius of curvature being different from the first radius of curvature, the cross-sectional shape of the third portion is a part of an ellipse, and the predetermined reference axis is located at a center of the diaphragm, and the first portion, the second portion, and the third portion each have a different cross-sectional shape along the plane that includes the predetermined reference axis.

2. The diaphragm according to claim 1, further comprising:

a fourth portion arranged in a circumferential direction with the first portion, the second portion, and the third portion, wherein a cross-sectional shape of the fourth portion is a part of an ellipse.

3. The diaphragm according to claim 2, wherein the cross-sectional shape of the third portion and the cross-sectional shape of the fourth portion are different.

4. The diaphragm according to claim 1, further comprising:

a connecting portion that continuously connects at least one of the following:

the first portion and the third portion; or the second portion and the third portion.

5. The diaphragm according to claim 4, wherein in a plan view, boundary lines of at least one of the following pairs are arranged in parallel:

a boundary line between the connecting portion and the first portion, and a boundary line between the connecting portion and the third portion; or a boundary line between the connecting portion and the second portion, and a boundary line between the connecting portion and the third portion.

6. The diaphragm according to claim 1, further comprising:

a neck portion connected to a voice coil, wherein a thickness at a boundary of the neck portion with the first portion is different from a thickness at a boundary of the neck portion with the third portion.

7. The diaphragm according to claim 1, wherein a thickness at an outer peripheral edge portion of the third portion is greater than a thickness at an outer peripheral edge portion of the first portion.

8. The diaphragm according to claim 1, wherein the diaphragm includes paper made from a material that contains at least one of chemical fiber or pulp.

9. The diaphragm according to claim 1, wherein the diaphragm includes injection-molded resin.

10. The diaphragm according to claim 1, wherein the diaphragm includes a press-molded sheet-or film-shaped material.

11. The diaphragm according to claim 1, comprising:

a neck portion that surrounds the predetermined reference axis extending in the vibration direction; and at least the first portion, the second portion, and the third portion outside the neck portion, wherein a cross-sectional shape of the neck portion, along any plane including the predetermined reference axis, is a uniform curve.

12. The diaphragm according to claim 11, wherein the cross-sectional shape of the neck portion is an arc.

13. The diaphragm according to claim 12, wherein a radius of curvature of the neck portion is one-tenth or less of a smaller one of the first radius of curvature and the second radius of curvature.

14. An electroacoustic transducer comprising:

the diaphragm according to claim 1;

a magnetic circuit;

a frame that holds the magnetic circuit and the diaphragm; and a voice coil coupled to the diaphragm and disposed in a magnetic gap included in the magnetic circuit.

15. The electroacoustic transducer according to claim 14, further comprising:

an edge interposed between the diaphragm and the frame and having an annular shape, wherein the edge includes a diaphragm connecting portion that follows a shape of an outer peripheral edge portion of the diaphragm.

16. The electroacoustic transducer according to claim 14, wherein the diaphragm includes:

a neck portion that surrounds the predetermined reference axis extending in the vibration direction; and at least the first portion, the second portion, and the third portion outside the neck portion, wherein a cross-sectional shape of the neck portion, along any plane including the predetermined reference axis, is a uniform curve.

17. The diaphragm according to claim 1, wherein an entire cross-sectional shape of the first portion is a single arc having the first radius of curvature, and an entire cross-sectional shape of the second portion is a single arc having the second radius of curvature.

18. The diaphragm according to claim 1, wherein an entire cross-sectional shape of the first portion, along any plane including the predetermined reference axis, is a single arc having the first radius of curvature, and an entire cross-sectional shape of the second portion, along any plane including the predetermined reference axis, is a single arc having the second radius of curvature.

19. The diaphragm according to claim 1, wherein the first portion extends continuously to an outer edge of the diaphragm, and an entire cross-sectional shape of the first portion, along any plane including the predetermined reference axis, is a single arc having the first radius of curvature, and the second portion extends continuously to the outer edge of the diaphragm, and an entire cross-sectional shape of the second portion, along any plane including the predetermined reference axis, is a single arc having the second radius of curvature.

20. The diaphragm according to claim 2, wherein the first portion and the second portion are arranged such that the first portion and the second portion are not adjacent to each other in the circumferential direction.

* * * * *